(12) United States Patent
Wu et al.

(10) Patent No.: US 11,262,942 B2
(45) Date of Patent: Mar. 1, 2022

(54) INTEGRATING HOST-SIDE STORAGE DEVICE MANAGEMENT WITH HOST-SIDE NON-VOLATILE MEMORY

(71) Applicant: ScaleFlux, Inc., San Jose, CA (US)

(72) Inventors: Qi Wu, San Jose, CA (US); Wentao Wu, Milpitas, CA (US); Thad Omura, Los Altos, CA (US); Yang Liu, Milpitas, CA (US); Tong Zhang, Albany, NY (US)

(73) Assignee: SCALEFLUX, INC., San Jose, CA (US)

( * ) Notice: Subject to any disclaimer, the term of this patent is extended or adjusted under 35 U.S.C. 154(b) by 136 days.

(21) Appl. No.: 16/509,626

(22) Filed: Jul. 12, 2019

(65) Prior Publication Data
US 2020/0019346 A1    Jan. 16, 2020

Related U.S. Application Data

(60) Provisional application No. 62/698,379, filed on Jul. 16, 2018.

(51) Int. Cl.
*G06F 3/06* (2006.01)
*G06F 12/06* (2006.01)

(52) U.S. Cl.
CPC .......... *G06F 3/0659* (2013.01); *G06F 3/0604* (2013.01); *G06F 3/068* (2013.01); *G06F 12/0646* (2013.01); *G06F 2212/1016* (2013.01); *G06F 2212/206* (2013.01); *G06F 2212/261* (2013.01); *G06F 2212/7203* (2013.01)

(58) Field of Classification Search
CPC ...... G06F 3/0659; G06F 3/0604; G06F 3/068; G06F 12/0646; G06F 2212/1016; G06F 2212/206; G06F 2212/261; G06F 2212/7203
See application file for complete search history.

(56) References Cited

U.S. PATENT DOCUMENTS

| | | | | |
|---|---|---|---|---|
| 9,239,784 | B1 * | 1/2016 | Haghighi | G06F 12/0868 |
| 10,078,470 | B2 * | 9/2018 | Suzuki | G06F 3/0655 |
| 2005/0210202 | A1 * | 9/2005 | Choubal | G06F 12/0835 |
| | | | | 711/138 |
| 2010/0115193 | A1 * | 5/2010 | Manus | G06F 12/0804 |
| | | | | 711/103 |
| 2012/0110230 | A1 * | 5/2012 | Ishikawa | G06F 13/364 |
| | | | | 710/241 |
| 2017/0180478 | A1 * | 6/2017 | Hashimoto | G06F 3/0688 |
| 2018/0107592 | A1 * | 4/2018 | Hashimoto | G06F 3/0619 |
| 2018/0267721 | A1 * | 9/2018 | Reddy | G06F 3/065 |

(Continued)

*Primary Examiner* — Nanci N Wong
(74) *Attorney, Agent, or Firm* — Hoffman Warnick LLC (57) ABSTRACT

The present disclosure relates to the field of solid-state data storage, and particularly to improving the speed performance and reducing the cost of solid-state data storage devices. A host-managed data storage system according to embodiments includes a set of storage devices, each storage device including a write buffer and memory; and a host coupled to the set of storage devices, the host including: a storage device management module for managing data storage functions for each storage device; memory including: a front-end write buffer; a first mapping table for data stored in the front-end write buffer; and a second mapping table for data stored in the memory of each storage device.

12 Claims, 7 Drawing Sheets

(56) References Cited

U.S. PATENT DOCUMENTS

2018/0267827 A1* 9/2018 Kanno ................... G06F 1/30
2018/0321855 A1* 11/2018 Martineau ............. G06F 3/0604
2019/0278710 A1* 9/2019 Ehrlich .................. G06F 3/061

* cited by examiner

INTEGRATING HOST-SIDE STORAGE DEVICE MANAGEMENT WITH HOST-SIDE NON-VOLATILE MEMORY

TECHNICAL FIELD

The present disclosure relates to the field of solid-state data storage, and more particularly to improving the performance and reducing the cost of solid-state data storage devices by integrating host-side storage device management with host-side non-volatile memory.

BACKGROUND

Solid-state data storage devices, which use non-volatile NAND flash memory technology, are being pervasively deployed in various computing and storage systems. In addition to including one or multiple NAND flash memory chips, each solid-state data storage device also contains a controller that manages all the NAND flash memory chips.

NAND flash memory cells are organized in an array-→block→page hierarchy, where one NAND flash memory array is partitioned into a large number (e.g., thousands) of blocks, and each block contains a number (e.g., hundreds) of pages. Data are programmed and fetched in the unit of a page. The size of each flash memory page typically ranges from 8 kB to 32 kB, and the size of each flash memory block is typically tens of MBs. Flash memory cells must be erased before being re-programmed, and the erase operation is carried out in the unit of a block (i.e., all the pages within the same block must be erased at the same time).

Solid-state data storage devices typically employ internal SRAM/DRAM with power loss protection to buffer incoming writes, which behaves as a non-volatile write buffer. Therefore, a solid-state data storage device can immediately acknowledge write requests to the host right after the data have reached the internal non-volatile write buffer. In the background, the solid-state data storage device moves data from the internal non-volatile write buffer to the NAND flash memory chips. As a result, the data write latency experienced by an application on the host is independent from the write latency of the NAND flash memory. Since the programming latency of NAND flash memory is very long (e.g., 1 ms and above), the use of internal non-volatile write buffering can significantly reduce the data write latency experienced by the applications on the host. This can significantly improve the performance of many applications, especially latency-critical applications (e.g., databases). Nevertheless, even with the non-volatile write buffer embedded inside solid-state data storage devices, the data write latency still contains noticeable I/O stack overhead, e.g., the latency of data transfer between DRAM and the solid-state data storage device and latency of handshaking between host and solid-state data storage device.

In order to improve speed performance, solid-state data storage devices write a relatively large data chunk (e.g., 128 kB or 256 kB) to NAND flash memory chips in parallel at the same time. Nevertheless, since the host accesses the solid-state data storage device in the unit of sectors, where each sector is only 512 B or 4 kB, the storage device controller has to use the non-volatile write buffer to accumulate a large enough amount of data before flushing the buffered data into NAND flash memory chips. Let $n_c$ denote the size (e.g., 128 kB or 256 kB) of data chunk that should be written to NAND flash memory in parallel at the same time. In order to reduce garbage collection overhead inside solid-state data storage devices, modern solid-state data storage devices are starting to support a feature called multi-stream data write. The basic idea of multi-stream data write can be described as follows: solid-state data storage devices categorize all the incoming data into m groups according to their expected lifetime so that all the data in the same group tend to have similar expected lifetime. The data in each group are written to different NAND flash memory blocks. To support multi-stream data write, the non-volatile write buffer inside solid-state data storage devices must accumulate and buffer multiple separate data chunks, where each data chunk corresponds to one write stream. This however demands the availability of a larger non-volatile write buffer (i.e., with the capacity of $m \cdot n_c$) inside solid-state data storage devices. Due to the cost of implementing power loss protection inside solid-state data storage devices, a larger write buffer capacity directly results in a higher manufacturing cost of solid-state data storage devices.

Moreover, in addition to multi-stream data write, it is highly desirable for solid-state data storage devices to support I/O isolation for different applications. To support true I/O isolation, solid-state data storage devices must internally partition NAND flash memory storage space into multiple parallel units. The access to one parallel unit is physically separate from the access to any other parallel units. As a result, solid-state data storage devices must dedicate different non-volatile write buffer space to different parallel units. Let p denote the number of parallel units being supported by one solid-state data storage device. The total capacity of the non-volatile write buffer inside the solid-state data storage devices has to increase by p times, leading to a total write buffer capacity of at least $p \cdot m \cdot n_c$. This inevitably further significantly increases the cost of solid-state data storage devices.

Finally, to improve application performance, it is also highly desirable for solid-state data storage devices to treat NAND flash memory read operations with a higher priority than NAND flash memory write operations. To achieve this objective, solid-state data storage devices should be able to flexibly schedule NAND flash memory read and write operations. This however demands the use of a large non-volatile write buffer (in addition to the basic write buffer space of $p \cdot m \cdot n_c$) inside solid-state data storage devices, which further increases the manufacturing cost of solid-state data storage devices.

Based on the above discussion, one can conclude that modern solid-state data storage devices are subject to a fundamental trade-off between performance and cost. As the capacity of the non-volatile write buffer inside solid-state data storage devices increases, performance improves but costs are higher.

SUMMARY

Accordingly, embodiments of the present disclosure are directed to methods for improving the performance and reducing the cost of solid-state data storage devices by integrating host-side storage device management with host-side non-volatile memory.

A first aspect of the disclosure is directed to a host-managed data storage system, including a set of storage devices, each storage device including a write buffer and memory; and a host coupled to the set of storage devices, the host including: a storage device management module for managing data storage functions for each storage device; memory including: a front-end write buffer; a first mapping table for data stored in the front-end write buffer; and a second mapping table for data stored in the memory of each storage device.

A second aspect of the disclosure is directed to a method for managing a data storage system including a set of flash-memory storage devices, each storage device including a write buffer and memory and supporting multi-stream data write, and a host coupled to the set of storage devices, the method including: allocating space in a memory of the host for a front-end write buffer; storing, in the memory of the host, a first mapping table for data stored in the front-end write buffer and a second mapping table for data stored in the memory of each storage device; and managing, by the host, data storage functions for each storage device, the data storage functions including: address mapping, managing the write buffer of each storage device, scheduling reads and writes for the memory of each storage device, and controlling movement of data from the write buffer of each storage device to the memory of the storage device.

These and other aspects are described below.

BRIEF DESCRIPTION OF THE DRAWINGS

The numerous advantages of the present disclosure may be better understood by those skilled in the art by reference to the accompanying figures.

DETAILED DESCRIPTION

Reference will now be made in detail to embodiments of the disclosure, examples of which are illustrated in the accompanying drawings.

Figure 1:
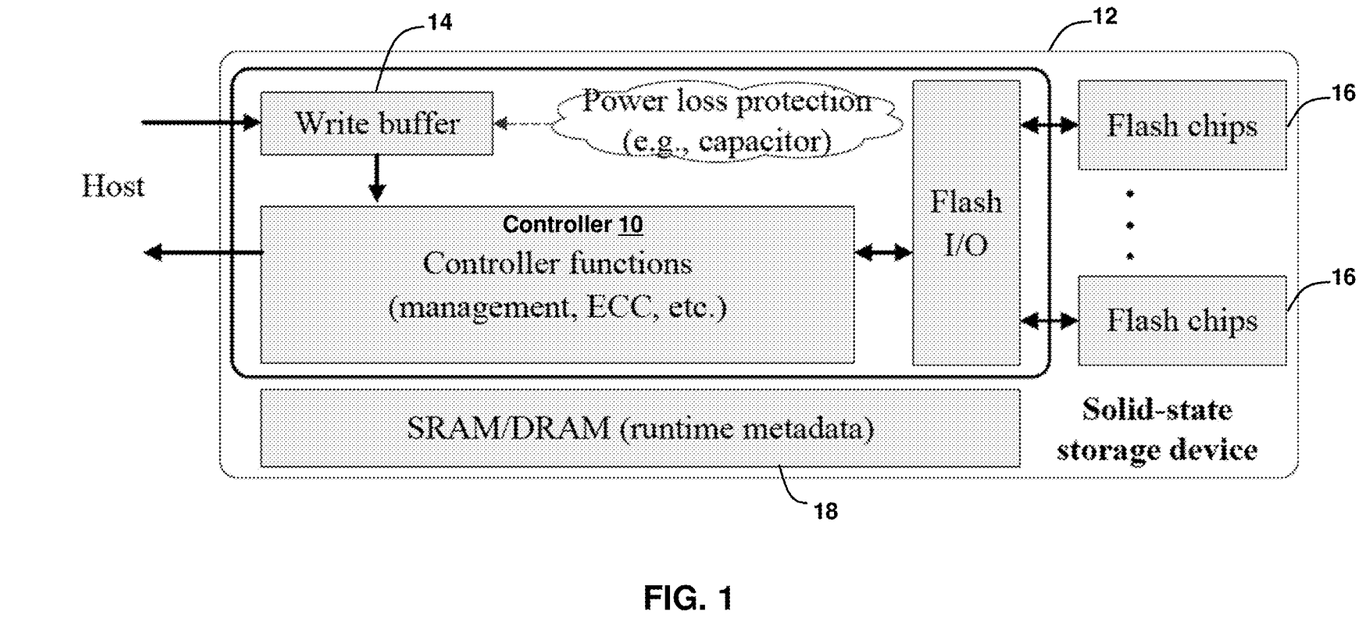
FIG. 1 illustrates the architecture of a solid-state storage device.

In conventional design practice, as illustrated in FIG. 1, the controller 10 inside a solid-state data storage device 12 is responsible for all the storage device management functions (e.g., logic and physical address mapping, write buffer management, flash memory read and write scheduling, etc.). Meanwhile, the non-volatile write buffer 14 (i.e., the SRAM/DRAM-based write buffer with power loss protection) completely resides inside the solid-state data storage device 12. The solid-state data storage device 12 further includes a set of NAND flash memory chips 16 and a sufficient amount of memory 18 (SRAM or DRAM) for storing necessary runtime metadata (e.g., address mapping table).

In order to improve the performance of solid-state data storage devices, it is highly desirable for solid-state data storage devices to have the following three features: (1) support for multi-stream data write, (2) provide true I/O isolation by using separate parallel units, and (3) flexibly schedule NAND flash memory read and write operations by giving read operations a higher priority. However, to effectively implement these three features, solid-state data storage devices must integrate a large-capacity non-volatile write buffer, which unfortunately can noticeably increase the fabrication cost of solid-state data storage devices. In addition, since this demands stronger power loss protection, it may degrade the storage device stability.

Figure 2:
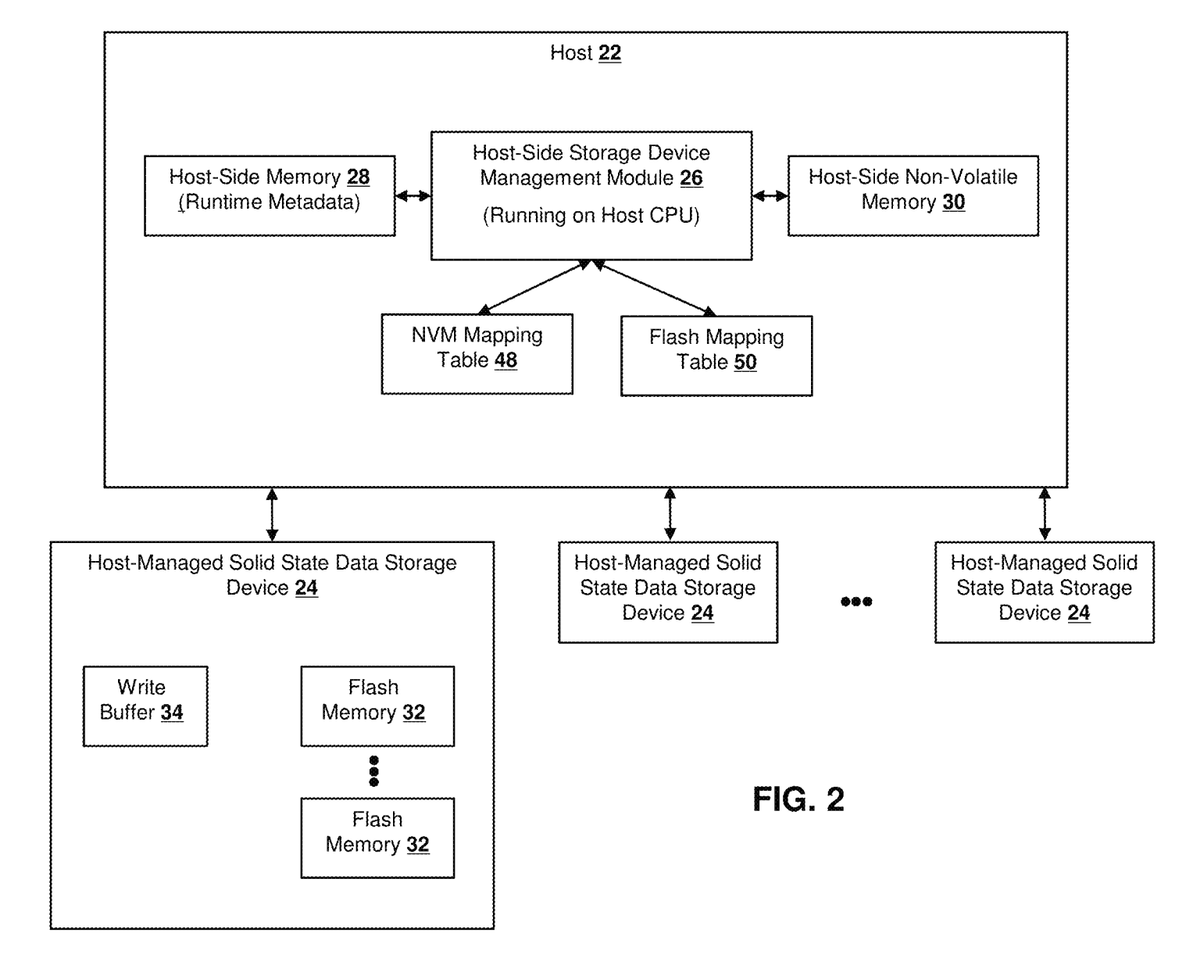
FIG. 2 illustrates the use of a host-side storage device management module and host-side non-volatile memory according to embodiments.

According to embodiments, the present disclosure presents a design strategy that can implement these three features to improve the performance of solid-state data storage devices without incurring the cost penalty suffered by conventional solid-state data storage devices. In particular, this may be achieved by providing host-side storage device management and host-side non-volatile memory. FIG. 2 depicts a host 22 (e.g., host computing system or server) and at least one host-managed solid-state data storage device 24 (hereafter storage device 24) according to embodiments.

Host-Side Storage Device Management

As described above with regard to FIG. 1, the controller 10 of the storage device 12 is responsible for all storage device management functions, while necessary runtime metadata (e.g., address mapping table) is stored in memory 18 on the storage device 12. However, according to embodiments, a significant portion of the storage device management functions (e.g. logic and physical address mapping, write buffer management, and flash memory read and write scheduling) are performed on the host 22 by a host-side storage device management module 26 (hereafter management module 26), rather than by a controller on the storage device 24. Hence, the CPU of the host 22 is responsible for carrying out these storage device management functions; the storage device 24 becomes a host-managed storage device. Further, most of the necessary runtime metadata is stored in host-side memory 28 (volatile or non-volatile memory), rather in memory on the storage device 24.

Host-Side Non-Volatile Memory

According to embodiments, the host 22 is equipped with non-volatile memory 30 (e.g., NVDIMM), from which the management module 26 can allocate and own a certain amount of memory space. Let $n_c$ denote the amount of data being written to NAND flash memory 32 on the storage device 24 in each stream at the same time. The storage device 24 internally contains a write buffer 34 with the total size of $k \cdot n_c$, where the constant factor k is relatively small (e.g., 4 or 6). Hence, the total capacity of the write buffer 34 in the storage device 24 is largely independent from the number of parallel units and the number of write streams in each parallel unit. To minimize the cost of the storage device 24, the write buffer 34 in the storage device 24 does not have to be non-volatile (i.e., does not need to be protected by power loss protection (e.g., volatile memory). As further illustrated in FIG. 2, the management module 26 on the host 22 may manage a set of storage devices 24 (e.g., one or more storage devices 24).

Figure 3:
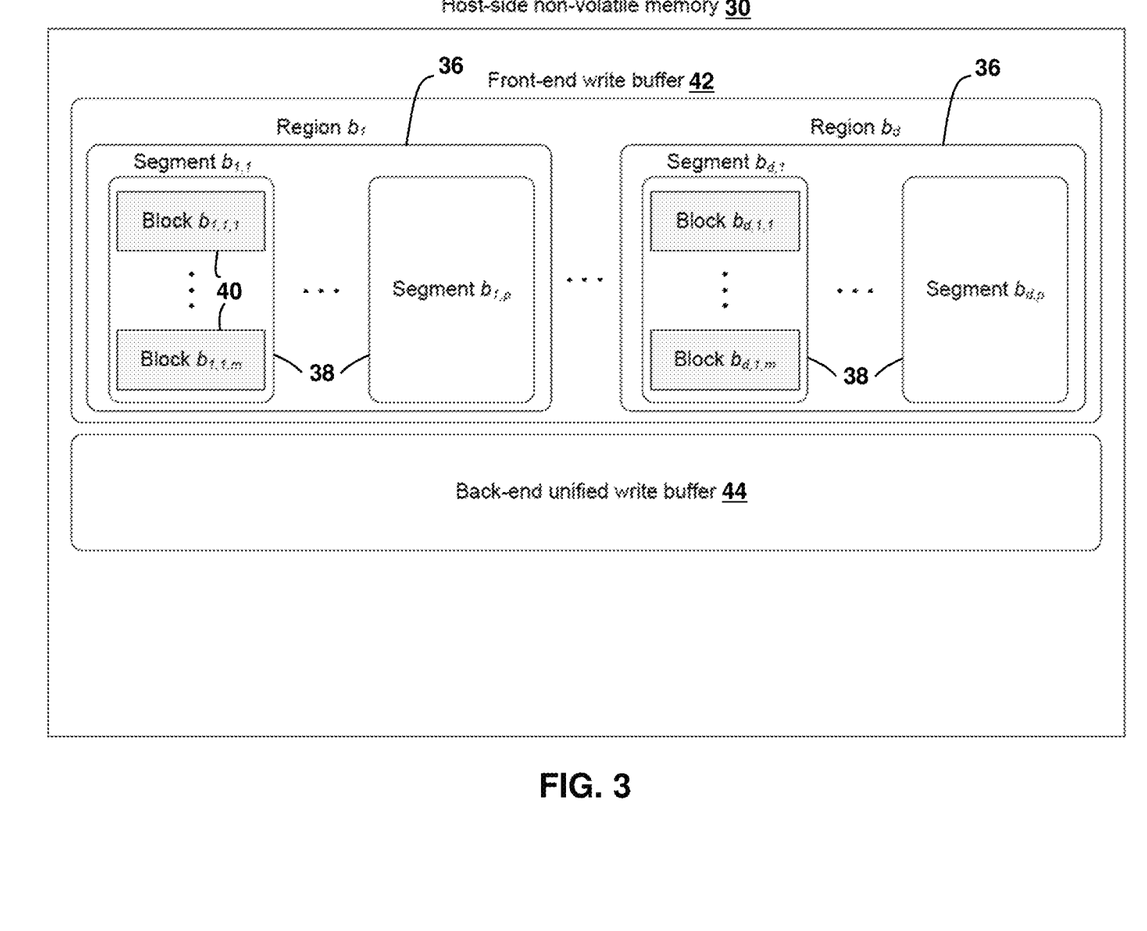
FIG. 3 illustrates the allocation of a front-end write buffer and back-end unified write buffer in the host-side non-volatile memory according to embodiments.

The management module 26 can leverage the host-side non-volatile memory 30 to improve the performance of storage devices 24 using the techniques described below. Let d denote the number of storage devices 24 coupled to a host 22. Let p denote the number of parallel units being supported by one storage device 24. Let m denote the number of streams being supported in each parallel unit. Therefore, the d storage devices 24 support a total of d·p·m streams. As illustrated in FIG. 3, the management module 26 allocates d memory regions 36 from the host-side non-volatile memory 30, where each memory region 36 corresponds to one storage device 24 and is denoted as $b_i$. Each memory region $b_i$ further contains p segments 38, where each segment 38 corresponds to one parallel unit in one storage device 24 and is denoted as $b_{i,j}$. Each memory segment $b_{i,j}$ further contains m blocks 40, where each block 40 corresponds to one write stream in one parallel unit and is denoted as $b_{i,j,k}$. The capacity of each memory block $b_{i,j,k}$ is $n_c$. Recall that $n_c$ denotes the amount of data being written to NAND flash memory in each stream at the same time. Therefore, the total capacity of each segment $b_{i,j}$ is $m \cdot n_c$, the total capacity of each region $b_i$ is $p \cdot m \cdot n_c$, and the total capacity of all the d regions is $d \cdot p \cdot m \cdot n_c$. Meanwhile, let $s_{i,j,k}$ denote the k-th write stream in the j-th parallel unit of the i-th storage device 24, and hence one write stream $s_{i,j,k}$ corresponds to one memory block $b_{i,j,k}$ in the host-side non-volatile memory 30. All the d regions 36 form a front-end write buffer 42 inside the host-side non-volatile memory 30.

The management module 36 also allocates additional space from the host-side non-volatile memory 30 to provide a back-end unified write buffer 44. Let h denote the capacity of the back-end unified write buffer 44. Therefore, the management module 26 allocates a total of $h + d \cdot p \cdot m \cdot n_c$ of write buffer space in the host-side non-volatile memory 30. In addition, the management module 26 maintains two address mapping tables in the host memory (either volatile or non-volatile memory space). The first mapping table is a non-volatile memory (NVM) mapping table 48, which covers the data being stored in the write buffers 42, 44 (with the capacity of $h + d \cdot p \cdot m \cdot n_c$) in the host-side non-volatile memory 30. The second mapping table is a flash mapping table 50, covers the data being stored in the NAND flash memory 32 in the storage devices 24.

Figure 4:
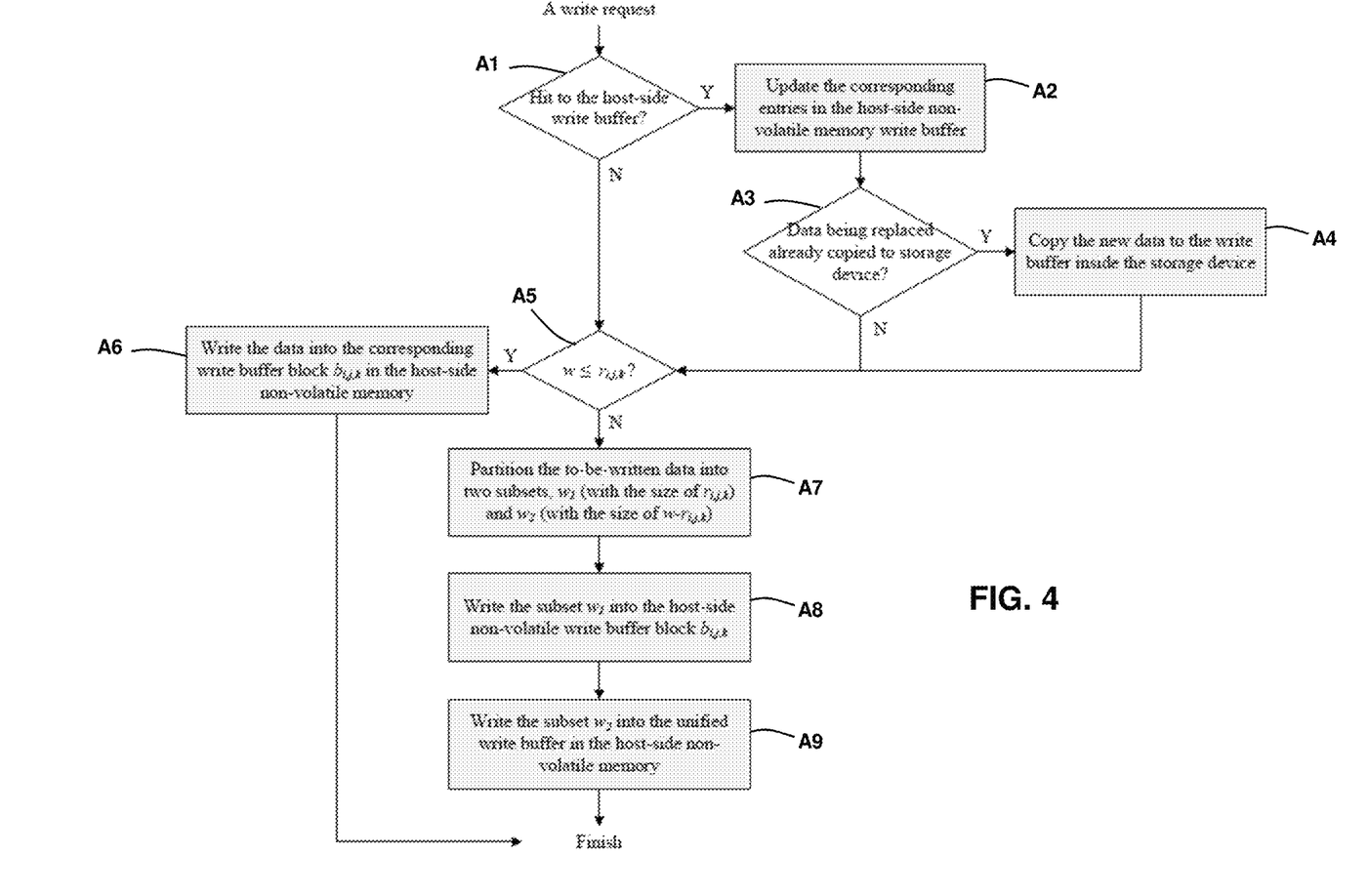
FIG. 4 illustrates an operational flow diagram of the processing of a write request according to embodiments.

FIG. 4 illustrates an operational flow diagram of the processing of a write request according to embodiments. FIGS. 2-4 are referred to simultaneously. At process A1, the management module 26 checks the NVM mapping table 48 for a possible write hit to the front-end write buffer 42 in the host-side non-volatile memory 30. In the case of a write hit (Y at process A1), the corresponding entries in the front-end write buffer 42 of the host-side non-volatile memory 30 are updated at process A2. Otherwise (N at process A1) flow passes to process A5.

At process A3, if the data that are replaced have already been copied to the write buffer 34 in a storage device 24, then, at process A4, the new data are immediately copied to the write buffer 34 to replace the old data. Otherwise (N at process A3) flow passes to process A5.

Suppose the residual to-be-written data in the write request has a capacity of w and targets the write stream $s_{i,j,k}$. Let $r_{i,j,k}$ denote the space in the block $b_{i,j,k}$ of the front-end write buffer 42 that has not yet been occupied with valid data. If the data can fit into the corresponding write buffer segment (i.e., $w \leq r_{i,j,k}$) (Y at process A5), then, at process A6, data is directly written into the corresponding write buffer block $b_{i,j,k}$ in the front-end write buffer 42 of the host-side non-volatile memory 30. Otherwise (i.e., $w > r_{i,j,k}$) (N at process A5), the to-be-written data is partitioned into two subsets at process A7, where the size of one subset (denoted as $w_1$) is $r_{i,j,k}$, and the size of the other subset (denoted as $w_2$) is $w - r_{i,j,k}$. At process A8, the subset $w_1$ is written into the write buffer block $b_{i,j,k}$ in the front-end write buffer 42 of the host-side non-volatile memory 30 and, at process A9, the subset $w_2$ is written into the unified write buffer 44 in the host-side non-volatile memory 30.

Figure 5:
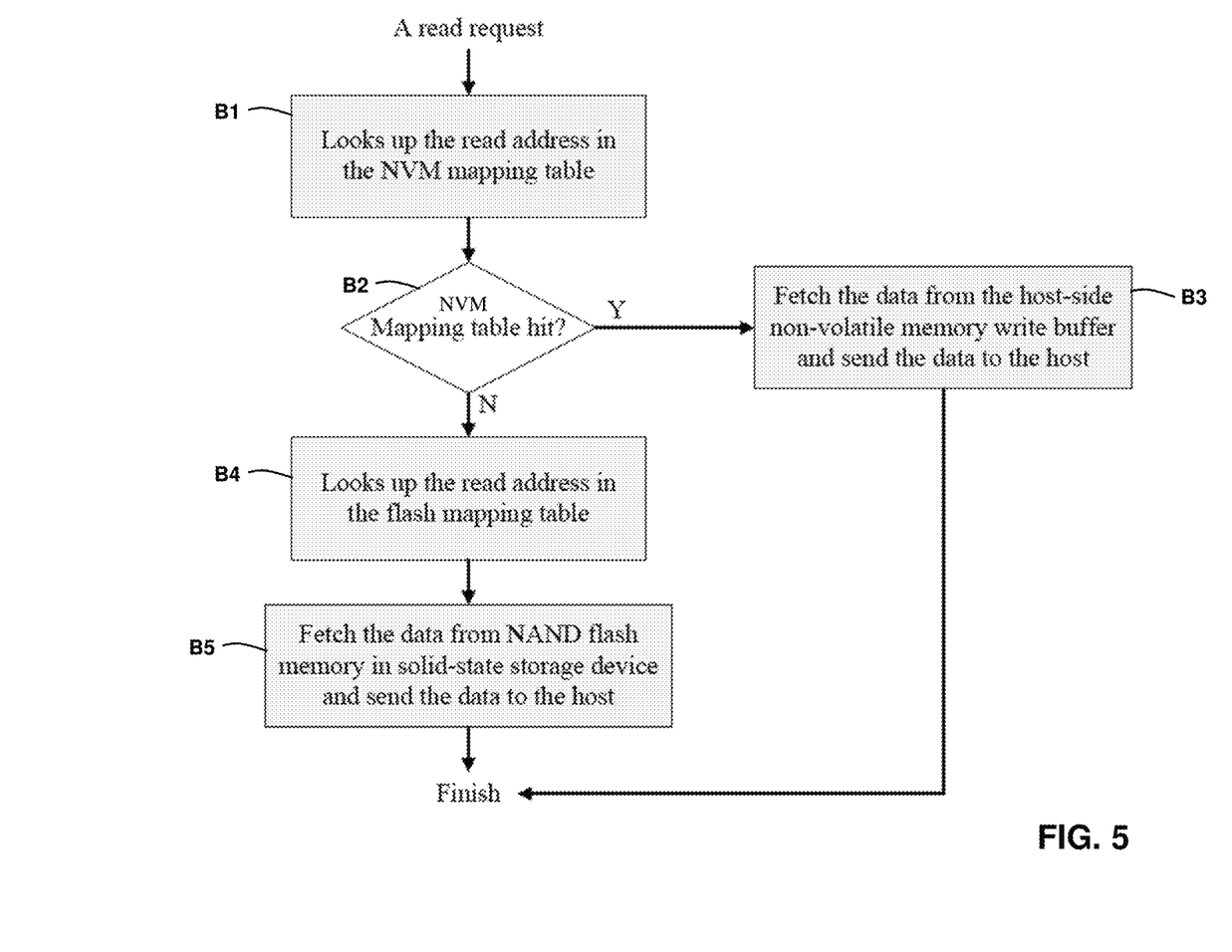
FIG. 5 illustrates an operational flow diagram of the processing of a read request according to embodiments.

FIG. 5 illustrates an operational flow diagram of the processing of a read request according to embodiments. FIGS. 2, 3, and 5 are referred to simultaneously. At process B1, in response a read request, the management module 26 looks up the read address in the NVM mapping table 48. If the read address hits the NVM mapping table 48 (Y at process B2), the management module 26 fetches the data from the front-side write buffer 42 of the host-side non-volatile memory 30 and sends the data to the host 22 at process B3. Otherwise (N at process B2), at process B4, the management module 26 looks up the read address in the flash mapping table 50 and, at process B5, fetches the data from the NAND flash memory 32 in the corresponding storage device 24 and sends the data to the host 22.

Figure 6:
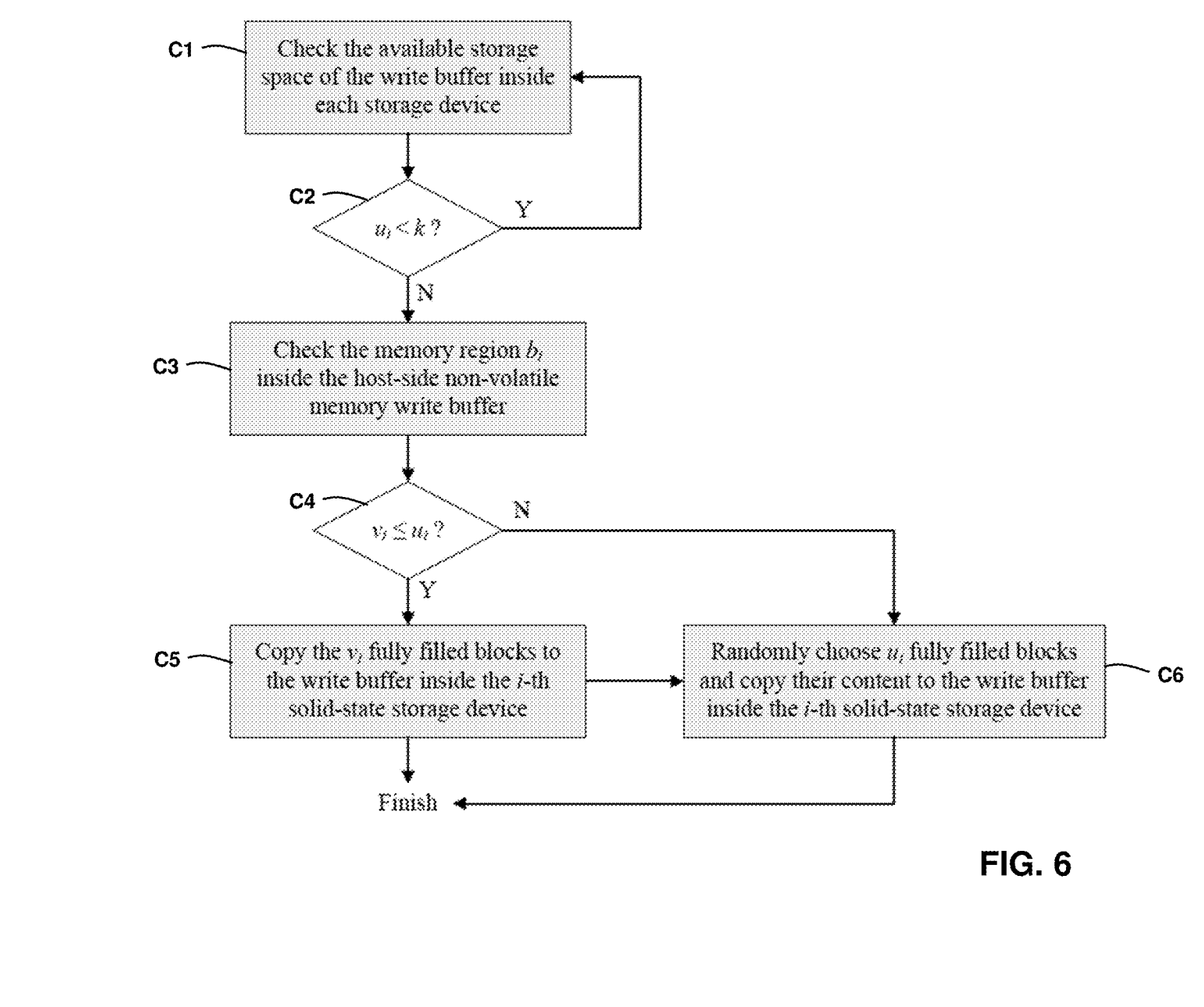
FIG. 6 illustrates an operational flow diagram of a process for copying data from host-side non-volatile memory into NAND flash memory inside solid-state data storage devices according to embodiments.

FIG. 6 illustrates an operational flow diagram of a process for copying data from the host-side non-volatile memory 30 into NAND flash memory 32 according to embodiments. FIGS. 2, 3, and 6 are referred to simultaneously. Recall that each storage device 24 internally contains a small write buffer 34 with the size of $k \cdot n_c$. At process C1, the management module 26 periodically checks the storage space of the write buffer 34 in each of the d storage devices 24. For the i-th storage device 24, let $u_i \cdot n_c$ (where $u_i \leq k$) denote the space in its internal write buffer 34 that is being occupied with valid data. If $u_i < k$ (i.e., the write buffer 34 in the storage device 24 can accept more data) (N at process C2) then, at process C3, the management module 26 checks the memory region $b_i$ inside the front-end write buffer 42 of the host-side non-volatile memory 30. Suppose the memory region $b_i$ contains $v_i$ fully filled blocks (note that the capacity of each block is $n_c$) whose content has not yet been copied to a storage device 24. If $v_i \leq u_i$ (Y at process C4) then, at process C5, the management module 26 copies the $v_i$ fully filled blocks to the write buffer 34 in the i-th storage device 24. Otherwise (N at process C4), at process C6, the management module 26 randomly chooses $u_i$ fully filled blocks and copies their content to the write buffer 34 inside the i-th storage device 34.

Inside each storage device 24, data must be moved from the small write buffer 34 to NAND flash memory 32. The management module 26 cohesively schedules the intra-device data movement and normal read requests in order to improve the read operation service quality without overflowing the front-end write buffer 42 of the host-side non-volatile memory 30. To facilitate such cohesive scheduling, the management module 26 maintains the following runtime characteristics: (1) Let $p_{i,j}$ denote the j-th parallel unit inside the i-th storage device 24. For each parallel unit inside each storage device 24, the management module 26 keeps a record of the amount of data that have been read from this parallel unit over a fixed most recent duration (e.g., 10 seconds), based upon which it maintains a read intensity factor of this parallel unit. The more data that have been read from this parallel unit over the fixed period, the higher the read intensity factor. Based upon the read intensity factor, a read priority factor $t_{i,j}$ is set for each parallel unit. The higher the read intensity factor, the higher the read priority factor $t_{i,j}$. (2) Inside the front-side write buffer 42 of the host-side non-volatile memory 30, let $d_{i,j}$ denote the amount of data that are associated with the parallel unit $p_{i,j}$. The management module 26 keeps a record of each $d_{i,j}$. Accordingly, a write priority factor $g_{i,jmn}$ for each parallel unit is set. The larger the value of $d_{i,j}$, the higher the write priority factor $g_{i,j}$.

Figure 7:
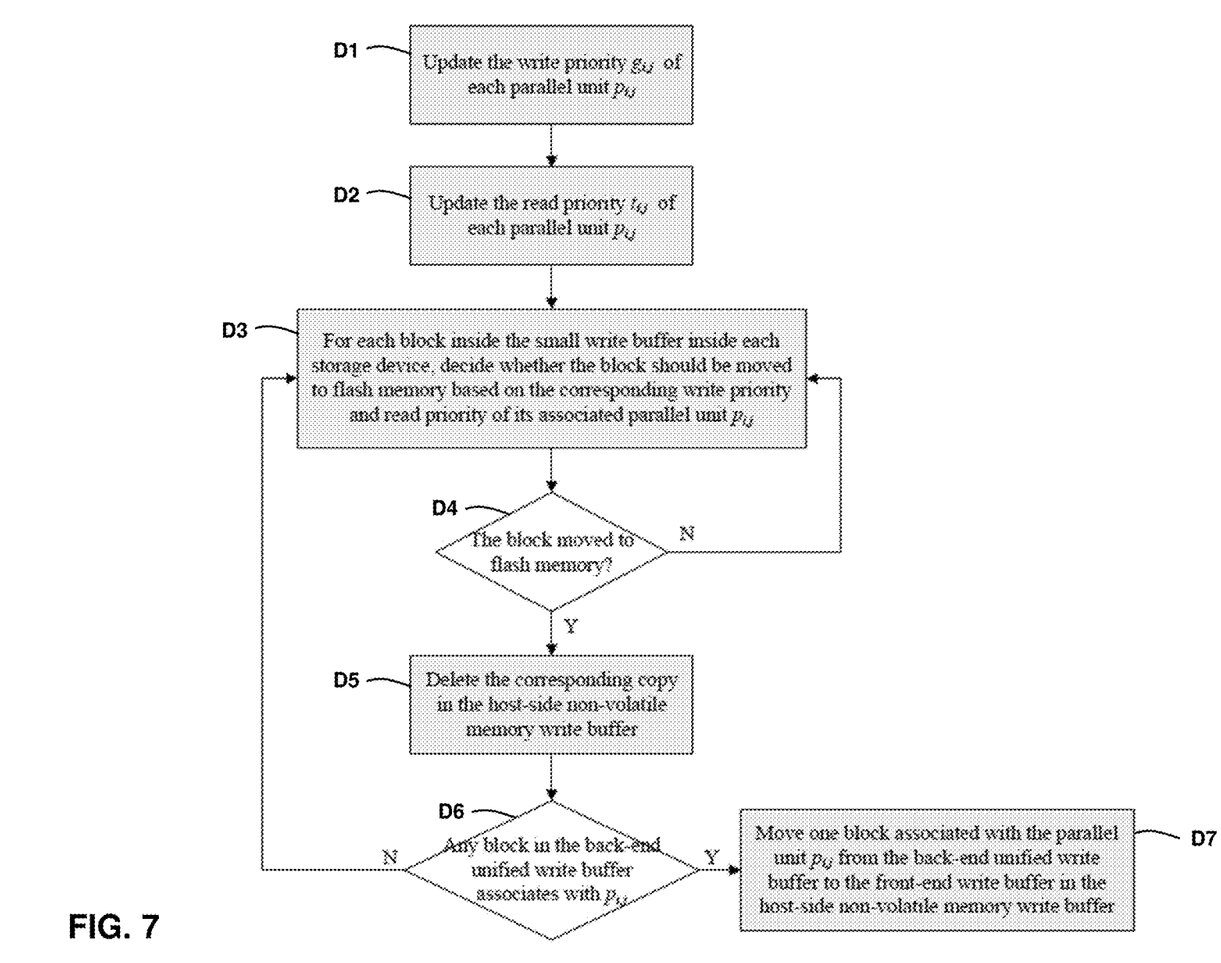
FIG. 7 illustrates an operational flow diagram of a process for cohesive intra-device data movement and normal read request scheduling according to embodiments.

FIG. 7 shows an operational flow diagram of the cohesive intra-device data movement and normal read request scheduling according to embodiments. FIGS. 2, 3, and 7 are referred to simultaneously. At processes D1 and D2, for the i-th storage device 24, the management module 26 obtains the updated write priority factor $g_{i,j}$ and updated read priority factor $t_{i,j}$ for each parallel unit. For each block in the write buffer 34 in the i-th storage device 24, assume this block is associated with the parallel unit $p_{i,j}$. Accordingly, $g_{i,j}$ is assigned as the write priority factor for this block. Then, at process D3, according to the runtime read request characteristics, a decision is made as to whether one block in the write buffer 34 should be moved to NAND flash memory 32 based on the corresponding write priority factor and read priority factor of its associated parallel unit $p_{i,j}$. For example, if the write priority factor $g_{i,j}$ is greater than the read priority factor $t_{i,j}$ of the associated parallel unit $p_{i,j}$, then the block is written from the write buffer 34 to the NAND flash memory 32, otherwise the block is not written. Once the block has been moved from the write buffer 34 to NAND flash memory 32 (Y at process D4), its corresponding copy in the write buffer 42 of the host-side non-volatile memory 30 is be deleted at process D5.

At process D6, if any block in the back-end unified write buffer 44 is associated with the parallel unit $p_{i,j}$ (Y at process D6), then, at process D7, one block associated with the parallel unit $p_{i,j}$ is moved from the back-end unified write buffer 44 to the front-end write buffer 42 in the host-side non-volatile memory 30. Otherwise (N at process D6), flow passes back to process D3.

It is understood that aspects of the present disclosure may be implemented in any manner, e.g., as a software program, or an integrated circuit board or a controller card that includes a processing core, I/O and processing logic. Aspects may be implemented in hardware or software, or a combination thereof. For example, aspects of the processing logic may be implemented using field programmable gate arrays (FPGAs), ASIC devices, or other hardware-oriented system.

Aspects may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by hardware and/or computer readable program instructions.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the present disclosure has been presented for purposes of illustration and description. It is not intended to be exhaustive or to limit the concepts disclosed herein to the precise form disclosed, and obviously, many modifications and variations are possible. Such modifications and variations that may be apparent to an individual in the art are included within the scope of the present disclosure as defined by the accompanying claims.

The invention claimed is:

1. A method for managing a data storage system including a set of flash-memory storage devices, each storage device including a write buffer and memory and supporting multi-stream data write, and a host coupled to the set of storage devices, wherein the write buffer of each storage device comprises volatile memory and is not protected against power loss, the method comprising:
    allocating space in a memory of the host for a front-end write buffer;
    storing, in the memory of the host, a first mapping table for data stored in the front-end write buffer and a second mapping table for data stored in the memory of each storage device;
    managing, by the host, data storage functions for each storage device, the data storage functions including: address mapping, managing the write buffer of each storage device, scheduling reads and writes for the memory of each storage device, and controlling movement of data from the write buffer of each storage device to the memory of the storage device; and,
    for each storage device, storing data from a block in the write buffer of the storage device to a parallel unit in the memory of the storage device if a write priority factor of the parallel unit is greater than a read priority factor of the parallel unit, wherein the read priority factor of the parallel unit is based on an amount of data read from the parallel unit over a fixed period of time, and wherein the write priority factor of the parallel unit is based on the amount of data in the front-end buffer that is associated with the parallel unit.

2. The method according to claim 1, further comprising, in response to a read request from the host:
    looking up a read address for the read request in the first mapping table;
    if the read address is not found in the first mapping table, looking up the read address in the second mapping table to determine the storage device associated with the read address, fetching data from the memory of the storage device associated with the read address, and sending the data to the host; and
    if the read address is found in the first mapping table, fetching data at the read address in the front-end write buffer and sending the data to the host.

3. The method according to claim 1, further comprising, in response to a write request from the host:
    looking up a write address for the write request in the first mapping table;
    if the write address is not found in the first mapping table, writing at least a portion of data in the write request to the front-end write buffer;
    if the write address is found in the first mapping table, writing the data to the write address in the front-end write buffer, determining if the data has already been copied from the front-end buffer to one of the storage devices, and if the data has already been copied to one of the storage devices, writing the data to the write buffer of that storage device.

4. A host-managed data storage system, comprising:
    a set of storage devices, each storage device including a write buffer and memory, wherein the write buffer of each storage device comprises volatile memory and is not protected against power loss; and
    a host coupled to the set of storage devices, the host including:
        a storage device management module for managing data storage functions for each storage device, wherein the data storage functions for each storage device managed by the storage device management module include: address mapping, management of the write buffer of each storage device, and read and write scheduling for the memory of each storage device;
        memory including: a front-end write buffer; a first mapping table for data stored in the front-end write buffer; and a second mapping table for data stored in the memory of each storage device,
    wherein each storage device supports multi-stream data write, and wherein the write buffer of each storage device has a size of $k \cdot n_c$, where k is a constant and $n_c$ denotes the amount of data being written to the memory of the storage device in each stream at the same time,
    wherein each storage device includes a number of parallel units and each parallel unit has a number of write streams, and wherein a total capacity of the write buffer of each storage device is independent from the number of parallel units in the storage device and the number of write streams in each parallel unit,
    wherein, for each storage device, the storage device management module controls movement of data from the write buffer of the storage device to the memory of the storage device,
    wherein, for each storage device, the storage device management module stores data from a block in the write buffer of the storage device to a parallel unit in the memory of the storage device if a write priority factor of the parallel unit is greater than a read priority factor of the parallel unit, wherein the read priority factor of the parallel unit is based on an amount of data read from the parallel unit over a fixed period of time, and wherein the write priority factor of the parallel unit is based on the amount of data in the front-end buffer that is associated with the parallel unit.

5. The storage system according to claim 4, wherein each storage device comprises a NAND flash memory storage device.

6. The storage system according to claim 4, wherein the set of storage devices support a total of $d \cdot p \cdot m$ streams, where d denotes the number of storage devices in the set of storage devices, p denotes the number of parallel units supported by each storage device, and m denotes the number of streams supported in each parallel unit.

7. The storage system according to claim 6, wherein the front-end buffer in the memory on the host has a capacity of $d \cdot p \cdot m \cdot n_c$.

8. The storage system according to claim 4, wherein, in response to a read request from the host, the storage device management module is configured to:
    look up a read address for the read request in the first mapping table; and
    if the read address is not found in the first mapping table, look up the read address in the second mapping table to determine the storage device associated with the read address, fetch data from the memory of the storage device associated with the read address, and send the data to the host.

9. The storage system according to claim 4, wherein, in response to a read request from the host, the storage device management module is configured to:
  look up a read address for the read request in the first mapping table; and
  if the read address is found in the first mapping table, fetch data at the read address in the front-end write buffer and send the data to the host.

10. The storage system according to claim 4, wherein, in response to a write request from the host, the storage device management module is configured to:
  look up a write address for the write request in the first mapping table; and
  if the write address is not found in the first mapping table, write at least a portion of data in the write request to the front-end write buffer.

11. The storage system according to claim 4, wherein, in response to a write request from the host, the storage device management module is configured to:
  look up a write address for the write request in the first mapping table; and
  if the write address is found in the first mapping table:
    write the data to the write address in the front-end write buffer;
    determine if the data has already been copied from the front-end buffer to one of the storage devices; and
    if the data has already been copied to one of the storage devices, write the data to the write buffer of that storage device.

12. A host-managed data storage system, comprising:
  a set of storage devices, each storage device including a write buffer and memory, wherein the write buffer of each storage device comprises volatile memory and is not protected against power loss; and
  a host coupled to the set of storage devices, the host including:
    a storage device management module for managing data storage functions for each storage device, wherein the data storage functions for each storage device managed by the storage device management module include: address mapping, management of the write buffer of each storage device, and read and write scheduling for the memory of each storage device;
    memory including: a front-end write buffer; a first mapping table for data stored in the front-end write buffer; and a second mapping table for data stored in the memory of each storage device,
  wherein each storage device supports multi-stream data write, and wherein the write buffer of each storage device has a size of $k \cdot n_c$, where k is a constant and $n_c$ denotes the amount of data being written to the memory of the storage device in each stream at the same time,
  wherein the set of storage devices support a total of $d \cdot p \cdot m$ streams, where d denotes the number of storage devices in the set of storage devices, p denotes the number of parallel units supported by each storage device, and m denotes the number of streams supported in each parallel unit,
  wherein the front-end buffer in the memory on the host has a capacity of $d \cdot p \cdot m \cdot n_c$,
  wherein, for each storage device, the storage device management module controls movement of data from the write buffer of the storage device to the memory of the storage device,
  wherein, for each storage device, the storage device management module stores data from a block in the write buffer of the storage device to a parallel unit in the memory of the storage device if a write priority factor of the parallel unit is greater than a read priority factor of the parallel unit, wherein the read priority factor of the parallel unit is based on an amount of data read from the parallel unit over a fixed period of time, and wherein the write priority factor of the parallel unit is based on the amount of data in the front-end buffer that is associated with the parallel unit.

* * * * *